(12) United States Patent
Aspinall (10) Patent No.: US 7,805,466 B2
(45) Date of Patent: Sep. 28, 2010

(54) STORING AND LOADING DATA IN AN ARRAY-BASED COMPUTING ENVIRONMENT

(75) Inventor: John Gerald Aspinall, Lexington, MA (US)

(73) Assignee: The MathWorks, Inc., Natick, MA (US)

( * ) Notice: Subject to any disclaimer, the term of this patent is extended or adjusted under 35 U.S.C. 154(b) by 345 days.

(21) Appl. No.: 11/888,505

(22) Filed: Aug. 1, 2007

(65) Prior Publication Data

US 2008/0016108 A1    Jan. 17, 2008

Related U.S. Application Data

(63) Continuation of application No. 11/488,381, filed on Jul. 17, 2006.

(51) Int. Cl.
G06F 12/00    (2006.01)
G06F 17/30    (2006.01)
G06F 15/16    (2006.01)

(52) U.S. Cl. ............... 707/812; 705/27; 709/227
(58) Field of Classification Search ............... None
See application file for complete search history.

(56) References Cited

U.S. PATENT DOCUMENTS

| | | | |
|---|---|---|---|
| 6,635,088 B1 | 10/2003 | Hind et al. | |
| 7,085,736 B2 * | 8/2006 | Keezer et al. | 705/27 |
| 7,225,249 B1 * | 5/2007 | Barry et al. | 709/227 |
| 7,490,073 B1 * | 2/2009 | Qureshi et al. | 706/50 |
| 2002/0046294 A1 | 4/2002 | Brodsky et al. | |
| 2002/0083034 A1 * | 6/2002 | Orbanes et al. | 707/1 |
| 2002/0099684 A1 * | 7/2002 | Ardoin et al. | 707/1 |
| 2002/0188595 A1 | 12/2002 | Underseth et al. | |
| 2003/0014588 A1 | 1/2003 | Hu et al. | |
| 2004/0167867 A1 * | 8/2004 | Owen et al. | 707/1 |
| 2004/0167871 A1 * | 8/2004 | Owen et al. | 707/1 |
| 2005/0021490 A1 * | 1/2005 | Chen et al. | 707/1 |
| 2005/0033725 A1 * | 2/2005 | Potter et al. | 707/1 |
| 2005/0091188 A1 * | 4/2005 | Pal et al. | 707/1 |
| 2005/0114097 A1 | 5/2005 | Duncan | |

(Continued)

OTHER PUBLICATIONS

Yihong Zhao; An Array-Based Algorithm for Simultaneous Multidimensional Aggregates; 1997; ACM; pp. 159-170.*

(Continued)

*Primary Examiner*—Neveen Abel Jalil
*Assistant Examiner*—Jermaine Mincey
(74) *Attorney, Agent, or Firm*—Lahive & Cockfield, LLP; Kevin J. Canning (57) ABSTRACT

A schema that enables a user to store data generated in an array-based computing environment in a scientific data file is disclosed. The schema may provide a mapping between the data types of the array-based computing environment and the data types of the scientific data file format. The schema may also apply when data is loaded from the scientific data file into the array-based computing environment. When the data is stored in the scientific data file, the file contains descriptions of the data as the variables of the array-based computing environment so that the data in the file can be loaded into the array-based computing environment without additional user input. The loaded variables (name and value) are identical to their state before the data is stored in the file.

21 Claims, 5 Drawing Sheets

U.S. PATENT DOCUMENTS

| | | | |
|---|---|---|---|
| 2005/0125375 A1 | 6/2005 | Lee et al. | |
| 2005/0154699 A1 | 7/2005 | Lipkin et al. | |
| 2005/0160057 A1 | 7/2005 | Wefers et al. | |
| 2005/0165724 A1 | 7/2005 | West | |
| 2005/0203865 A1 | 9/2005 | Sundararajan et al. | |
| 2005/0234848 A1 | 10/2005 | Lawrence et al. | |
| 2005/0240447 A1 | 10/2005 | Kil et al. | |
| 2005/0268341 A1 | 12/2005 | Ross | |
| 2006/0116976 A1* | 6/2006 | Legault et al. | 707/1 |
| 2006/0122958 A1 | 6/2006 | Beisiegel et al. | |
| 2006/0136362 A1 | 6/2006 | Jones et al. | |
| 2006/0200439 A1 | 9/2006 | Bhatia et al. | |
| 2006/0202037 A1* | 9/2006 | Gunawardena et al. | 235/462.15 |
| 2006/0242223 A1 | 10/2006 | Shawver et al. | |
| 2006/0253417 A1 | 11/2006 | Brownrigg et al. | |
| 2007/0150432 A1 | 6/2007 | Chandrasekar et al. | |

OTHER PUBLICATIONS

R. Agrawal; Object Database and Environment: the language adn the data model; ACM; 1989; pp. 1-10.*

European Office Action for Application No. 07836095.5, dated Apr. 20, 2009.

Hierarchical Data Format (HDF) Group et al., "HDF5 Reference Manual, Release 1.6.5," (2005).

Otoo, Ekow J. et al., "Efficient Storage Allocation of Large-Scale Extendible Multi-dimensional Scientific Datasets," *Proceedings of the 18th International Conference on Scientific and Statistical Database Management*, pp. 179-183 (2006).

Invitation to Pay Additional Fees for Application No. PCT/US2007/016193, dated Feb. 4, 2008.

The MathWorks, Inc, "Matlab, The Language of Technical Computing, Using Matlab, Version 6," pp. 5-1-5-13 (2000).

European Summons to Attend Oral Proceedings for Application No. 07836095.5. dated Jul. 15, 2010.

* cited by examiner

Sparse Matrix ⟵ 41

$$\begin{pmatrix} 0 & 0 & 7 & 0 \\ 0 & 0 & 0 & 3 \\ 0 & 1 & 0 & 0 \\ 0 & 0 & 0 & 0 \\ 14 & 0 & 0 & 0 \end{pmatrix}$$

Data ⟵ 43    Ir ⟵ 45    Jc ⟵ 47

$$\begin{pmatrix} 14 \\ 1 \\ 7 \\ 3 \end{pmatrix} \quad \begin{pmatrix} 5 \\ 3 \\ 1 \\ 2 \end{pmatrix} \quad \begin{pmatrix} 1 \\ 2 \\ 3 \\ 4 \end{pmatrix}$$

*Fig. 4B*

STORING AND LOADING DATA IN AN ARRAY-BASED COMPUTING ENVIRONMENT

RELATED APPLICATION

This application is a continuation of U.S. patent application Ser. No. 11/488,381, filed Jul. 17, 2006, the entire content of which is incorporated by reference herein.

FIELD OF THE INVENTION

The present invention relates generally to an array-based computing environment and more particularly to a method, system, and mediums for storing and loading data in the array-based computing environment.

BACKGROUND OF THE INVENTION

MATLAB® from The MathWorks, Inc. of Natick, Mass. provides a technical computing environment. MATLAB® provides an array-based computing environment in which a workspace consisting of a set of named arrays (variables) is built up during a MATLAB® session and stored in memory. In the conventional MATLAB® environment, the data generated in the workspace is stored in a MAT file format. A MAT file stores data in binary form. When a user creates a MAT file, the arrays in the workspace are saved in the MAT file as a continuous byte stream.

Since a MAT file stores data in binary form, it may require a large size of storage to save a large size of data, such as scientific data. A scientific data file format has been developed to save a large size of scientific data. An example of the scientific data file format can be found in Hierarchical Data Format, Version 5 (HDF5) file format. The HDF5 file format is a general purpose format for scientific data, supported by public domain code and documentation. It would be desirable to be able to store the data generated in the MATLAB® environment using a scientific data file format, such as HDF5.

SUMMARY OF THE INVENTION

The illustrative embodiment of the present invention provides a schema that enables a user to store in a scientific data file format the data generated and used in an array-based computing environment. The schema may provide a mapping between the data types of the array-based computing environment and the data types of the scientific data file format. The schema may apply when the data stored in the scientific data file is loaded into the array-based computing environment. When the data is stored in a container or repository, such as a file, a database, memory and storage, with a scientific data file format, the container or repository contains descriptions of the data as the variables of the array-based computing environment so that the data in the container or repository can be loaded into the array-based computing environment without additional user input and the loaded variables (name and value) are identical to their state when they are stored in the container or repository.

In one aspect of the present invention, a method is provided for storing or loading data in an array-based computing environment. Data is generated in a workspace of the array-based computing environment. The data is stored in a Hierarchical Data Format, Version 5 (HDF5) file, wherein types of the data in the array-based computing environment are automatically mapped to corresponding data types of the HDF5 file. The data of the HDF5 file may be loaded into the array-based computing environment.

In another aspect of the present invention, a system is provided for storing or loading data in an array-based computing environment. The system includes a workspace for containing data generated in the array-based computing environment. The system also includes a storage unit for storing the data in a Hierarchical Data Format, Version 5 (HDF5) file. The system further includes a schema for mapping the types of the data in the workspace to corresponding data types of the HDF5 file.

In another aspect of the present invention, a computer program product holding instructions executable in a computer is provided for storing or loading data in an array-based computing environment. Data is generated in a workspace of the array-based computing environment. The data is stored in a Hierarchical Data Format, Version 5 (HDF5) file, wherein types of the data in the array-based computing environment are automatically mapped to corresponding data types of the HDF5 file. The data of the HDF5 file may be loaded into the array-based computing environment.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

The illustrative embodiment of the present invention provides a mapping between data types of an array-based computing language and data types of a scientific data format, such as a Hierarchical Data Format, Version 5 (HDF5). The illustrative embodiment provides a schema for storing data from the workspace of the array-based computing language into a file in HDF5. The schema of the illustrative embodiment may also apply to the data stored in the HDF5 file when the data is loaded into the workspace of the array-based computing language. The embodiment of the present invention will be described below only for illustrative purposes relative to MATLAB®. Although the illustrative embodiment is described relative to MATLAB®, those of skill in the art will appreciate that the present invention may be practiced in other computing or programming environments. Those of skill in the art will also appreciate that the schema may be modified to use other scientific file formats, such as CDF (Common Data Format), FITS (Flexible Image Transport System), GRIB (GRid In Binary), NetCDF (Network Common Data Form), etc. Those of skill in the art will further appreciate that although the illustrative embodiment is described relative to a file as a container of the data in a scientific data format, the data can be stored in different types of containers or repositories, such as a database, memory and storage, in other embodiments.

Figure 1:
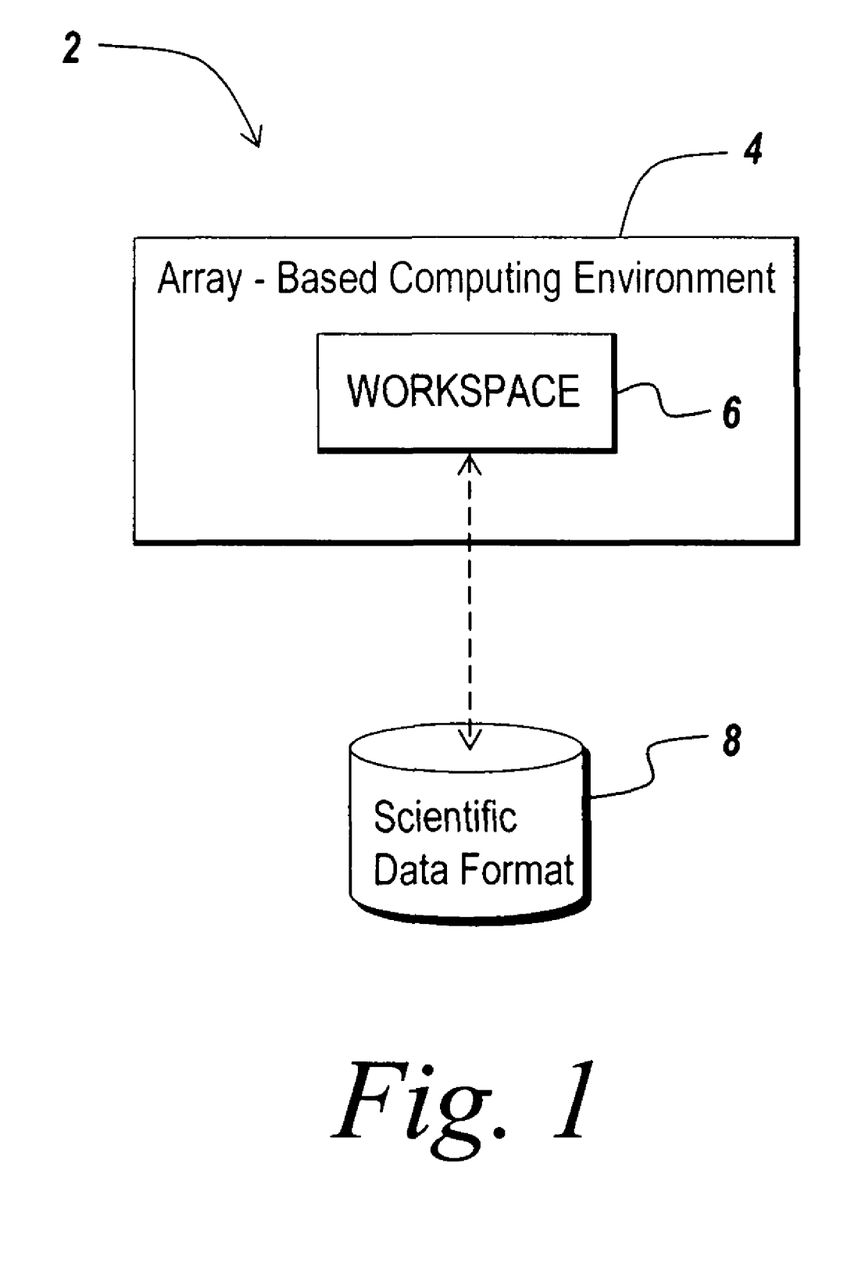
FIG. 1 depicts an exemplary system suitable for practicing the illustrative embodiment of the present invention.

FIG. 1 is an exemplary system 2 suitable for practicing the illustrative embodiment of the present invention. The system 2 may include an array-based computing environment 4 and a scientific data format file 8 for storing data in the workspace 6. An exemplary array-based computing environment 4 can be provided by MATLAB® from The MathWorks, Inc. of Natick, Mass. MATLAB® is an intuitive language and provides a technical computing environment. The MATLAB® environment integrates mathematical computing, visualization, and a powerful technical language. MATLAB® provides core mathematics and advanced graphical tools for data analysis, visualization, and algorithm and application development. MATLAB® provides a range of computing tasks in engineering and science, from data acquisition and analysis to application development. Built-in interfaces of MATLAB® enable users to access and import data from instruments, files, and external databases and programs. In addition, MATLAB® enables the users to integrate external routines written in C, C++, Fortran, and Java with the MATLAB® applications.

MATLAB® supports dynamically typed programming. In a dynamically typed programming environment, types are assigned to each data value in memory at runtime, rather than assigning a type to a static, syntactic entity in the program source code. The dynamically typed programming environment catches errors related to the misuse of values at the time the erroneous statement or expression is executed. In contrast, types are assigned to sets of values based on the program's source code in a statically typed programming environment. Static type disciplines operate on program source code rather than on the program execution. Therefore, in the statically typed programming environment, certain kinds of errors are detected without executing the program.

The computing environment 4 may include a workspace 6 for containing data generated and used in the computing environment 4. In the illustrative embodiment, the workspace 6 refers to memory space for the names and values of any variables used in the current MATLAB® session. The workspace 6 can be named and hierarchical, so that one workspace may include a variable that is a workspace itself. A variable is a symbol used to contain a value. A variable may be a scalar variable or array variable. A scalar variable is a variable that contains a single number. MATLAB® enables a user to handle a collection of numbers ("array") as a single variable. A user may use variables to write expressions. The following MATLAB® session is an example to compute b=sin(a) for a=0, 0.1, 0.2, ..., 10.

>>a=[0:0.1:10];

>>b=sin(a);

In the example, the second line computes b=sin(a) 101 times for each value in the array a to produce an array b that has 101 values. The arrays a and b are contained in the workspace 6. The data provided in the work space may be time series data encapsulated in an object. Time series data is a sequence of data measured at successive times spaced apart at time intervals. The time series data may be encapsulated in a time series object or time series collection object. The time series object encapsulates the time, data and metadata within a single object. The time series collection object stores one or more time series objects with different sequences of time series data. The times series object and time series collection object are described in more detail in co-pending U.S. patent application Ser. No. 11/475,320 (Title: ANALYSIS OF A SEQUENCE OF DATA IN OBJECT-ORIENTED ENVIRONMENT), the content of which is incorporated by reference.

The system 2 may also include a scientific data format file 8 for storing data in the workspace 6. The data stored in the file 8 may be loaded into the workspace. In the illustrative embodiment, the file 8 is provided externally to the computing environment 4. Those of ordinary skill in the art will appreciate that the system 2 depicted in FIG. 1 is illustrative and the file 8 may be provided internally to the computing environment 4 in other embodiments.

Data may be stored in the file 8 using HDF5. The HDF5 format is a general purpose format for scientific data and supported by public domain code and documentation. HDF5 is designed to store data of a large size, for example in a file. HDF5 files can contain data and metadata. HDF5 files organize the data and metadata, called attributes, in a hierarchical structure, similar to the hierarchical structure of a file system. In an HDF5 file, the directories in the hierarchy are called groups. A group can contain other groups, datasets, attributes, links, and data types.

A dataset is a collection of data, such as a multidimensional numeric array or string. A dataset includes a header and a data array. The header contains information on the array portion of the dataset. Header information includes the name of the object, data space, data type, information about how the data is stored on disk, and other information.

Data types are a description of the data in the dataset or attribute. Data types give information on how to interpret the data in the dataset. In HDF5, there are two categories of data types: atomic data types and compound data types. Each atomic data type belongs to a particular class and has several properties: size, order, precision, and offset. Atomic classes include integer, float, date and time, string, bit field, and opaque. Properties of integer types include size, order (endian-ness), and signed-ness (signed/unsigned). Properties of float types include the size and location of the exponent and mantissa, and the location of the sign bit. A compound data type is one in which a collection of several data types are represented as a single unit, a compound data type, similar to a struct in C. The parts of a compound data type are called members. The members of a compound data type may be of any data type, including another compound data type.

A data space describes the dimensionality of the dataset. The dimensions of a dataset can be fixed (unchanging), or they may be unlimited, which means that they are extendible (i.e. they can grow larger). Properties of a data space consist of the rank (number of dimensions) of the data array, the actual sizes of the dimensions of the array, and the maximum sizes of the dimensions of the array. For a fixed-dimension dataset, the actual size is the same as the maximum size of a dimension.

An attribute is any data that is associated with another entity. Attributes are small named datasets that are attached to primary datasets, groups, or named data types. Attributes can be used to describe the nature and/or the intended usage of a dataset or group. An attribute has two parts: (1) a name and (2) a value. The value part contains one or more data entries of the same data type.

A link is similar to a UNIX file system symbolic link. Links are a way to reference data without having to make a copy of the data.

One of ordinary skill in the art will also appreciate that the computing environment 4 and the storage may be provided on the same device, which will be described below in more detail with reference to FIG. 2, or alternatively, the computing environment 4 and the storage may be provided in a network environment, which will be described below in more detail with reference to FIG. 3.

Figure 2:
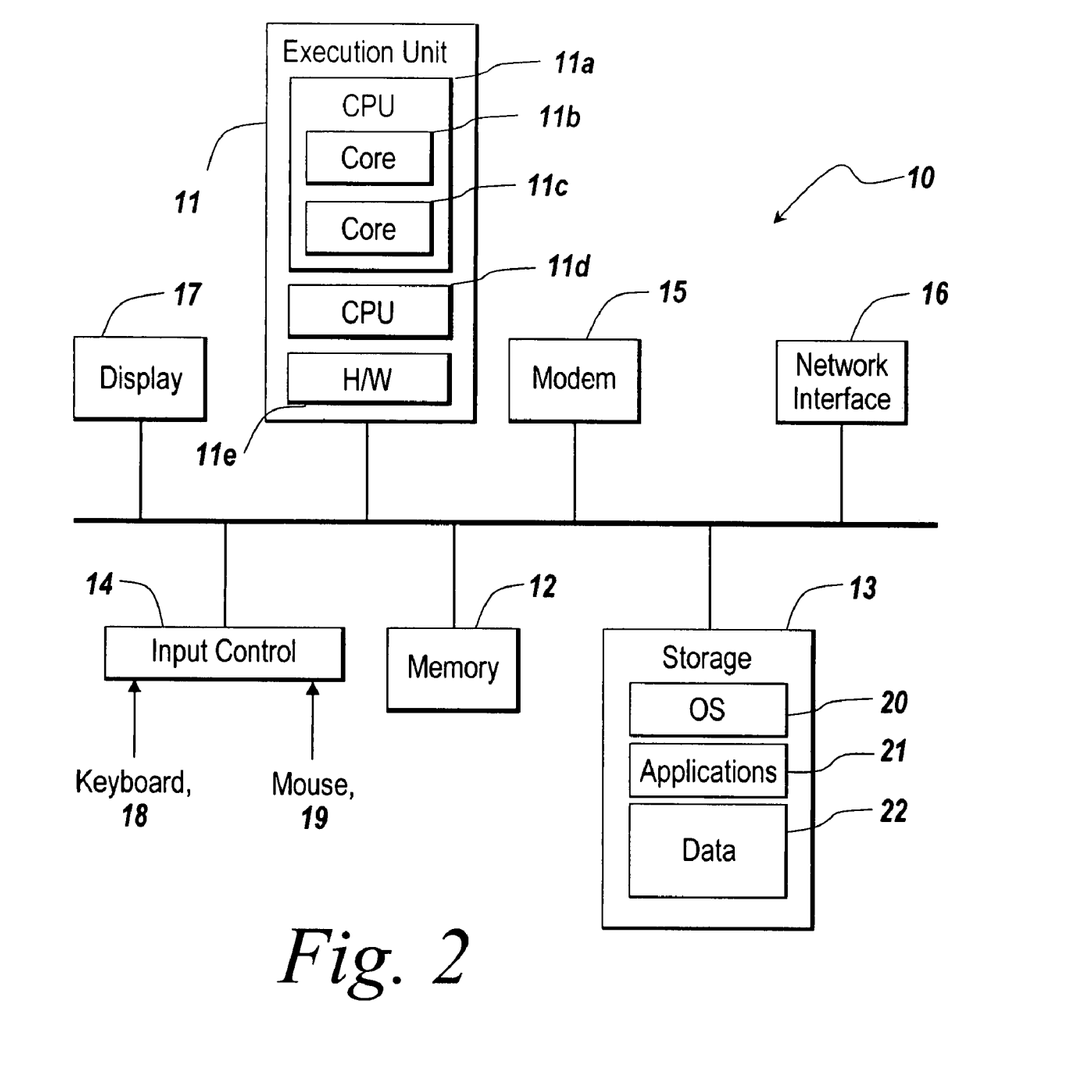
FIG. 2 shows an exemplary computing device for implementing the illustrative embodiment of the present invention.

FIG. 2 is an exemplary computing device 10 suitable for practicing the illustrative embodiment of the present invention. One of ordinary skill in the art will appreciate that the computing device 10 is intended to be illustrative and not limiting of the present invention. The computing device 10 may take many forms, including but not limited to a workstation, server, network computer, quantum computer, optical computer, bio computer, Internet appliance, mobile device, a pager, a tablet computer, and the like.

The computing device 10 may be electronic and include an execution unit 11, memory 12, storage 13, an input control 14, a modem 15, a network interface 16, a display 17, etc. The execution unit 11 controls each component of the computing device 10 to provide the computing environment 4 and the file 8. The memory 12 temporarily stores instructions and data and provides them to the execution unit 11 so that the execution unit 11 operates the computing device 10.

Optionally, the computing device 10 may include multiple Central Processing Units (CPUs) 11a and 11d for executing software loaded in the memory 12, and other programs for controlling system hardware. Each of the CPUs 11a and 11d can include a single core or multiple cores 11b and 11c. The code loaded in the memory 12 may run in a virtualized environment, such as in a Virtual Machine (VM). Multiple VMs may be resident on a single processor. Also, part of the application could be run in hardware 11e, for example, by configuring a field programmable gate array (FPGA) or creating an application specific instruction processor (ASIP) or an application specific integrated circuit (ASIC).

The storage 13 may contain software tools for applications. The storage 13 may include, in particular, code 20 for the operating system (OS) of the device 10, code 21 for applications running on the operation system including the computing environment 6, and data 22 for the file 8. Those of ordinary skill in the art will appreciate that the application can be stored in the memory 12 as well, much like the data, and even the OS, or they can be stored on the network described below with reference to FIG. 3.

The input control 14 may interface with a keyboard 18, a mouse 19, and other input devices. The computing device 10 may receive through the input control 14 input data, such as the input commands in the MATLAB® session. The computing device 10 may display on the display 17 the data generated or used in the MATLAB® session. The computing device 10 may also display user interfaces that enable a user to save data in the HDF5 file or to load data from the HDF5 file.

Figure 3:
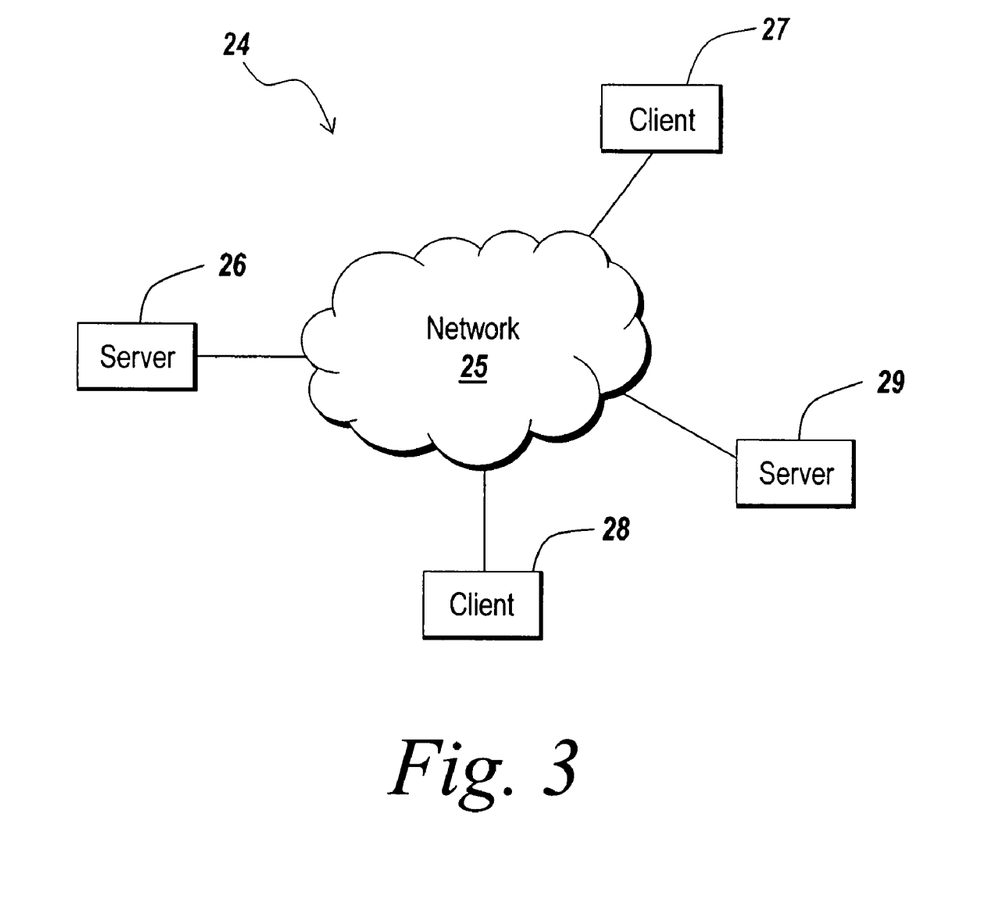
FIG. 3 is an exemplary network environment that enables an online implementation of the present invention.

FIG. 3 is an exemplary network environment 24 suitable for the distributed implementation of the illustrative embodiment. The network environment 24 may include one or more servers 26 and 29 coupled to clients 27 and 28 via a communication network 25. The network interface 16 and the modem 15 of the computing device 10 enable the servers 26 and 29 to communicate with the clients 27 and 28 through the communication network 25. The communication network 25 may include Internet, intranet, LAN (Local Area Network), WAN (Wide Area Network), MAN (Metropolitan Area Network), wireless network (e.g., using IEEE 802.11 and Bluetooth), etc. The communication facilities can support the distributed implementations of the present invention.

In the network environment 24, the client 28 may run a MATLAB® session and generate data in the workspace 6. The client 28 may send the data to the server 26 for storage. The server 26 may include a storage unit for storing the data in an HDF5 file. In response to the client's request for loading data from the server 28, the server 26 may send the data in the HDF5 file to the client 28 or a different client 27. The client 27 or 28 may load the data from the server into the workspace with the same state as the data before the data is saved to the server. In another embodiment, the workspace and storage may reside in the servers 26 and 29, respectively, and be coupled to each other through the communication network 25. The servers 26 and 29 may communicate with each other through the communication network 25.

In the networked environment, multiple computing environments may cooperate to share data between them, and to coordinate on saving that data. For example, the clients 28 and 29 may run separate computing environments and share data using, for example, distributed arrays. Distributed arrays may be distributed across the clients 28 and 29 and each computing environment of the clients 28 and 29 handles calculation on a portion of the distributed arrays. The data in the distributed arrays may be stored in a HDF5 file. Distributed arrays are described in detail in U.S. patent application Ser. No. 10/940,152 filed on Sep. 13, 2004, entitled "METHODS AND SYSTEM FOR EXECUTING A PROGRAM IN MULTIPLE EXECUTION ENVIRONMENTS," the content of which is incorporated by reference.

Figure 4A:
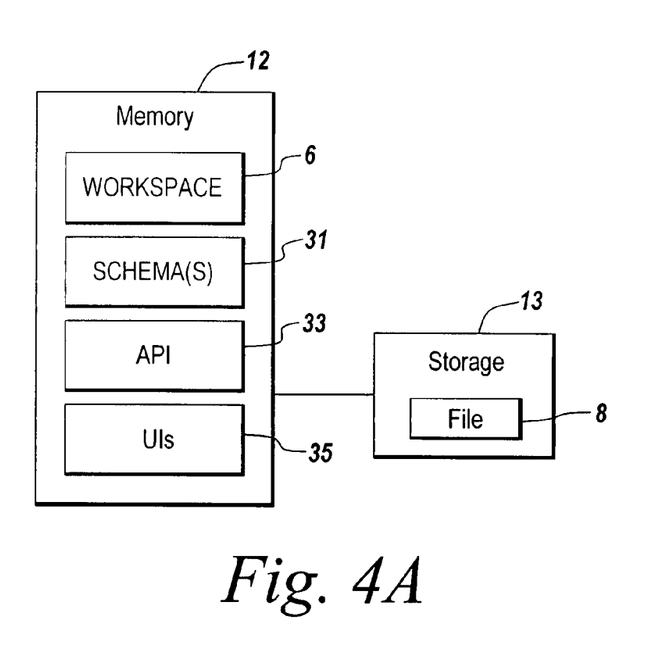
FIG. 4A shows a detailed configuration of the computing environment depicted in FIG. 1.

FIG. 4 shows a detailed configuration of the computing environment 4 depicted in FIG. 1. The computing environment includes schema 31 for mapping between the MATLAB® data types and the HDF5 data types. The schema 31 may enable data in the workspace 6 to be stored in the HDF5 file 8 and the data in the HDF5 file 8 to be loaded in the MATLAB® workspace 6. When the data is stored in the HDF5 file 8, the HDF5 file 8 also contains descriptions of the data as MATLAB® variables so that the data in the file 8 can be loaded into MATLAB® workspace 6 without additional user input. The schema 31 specifies how to store data in an HDF5 file in such a manner that when the HDF5 file 8 is loaded into the computing environment 4, the loaded variables (name and value) are identical to their state on the saving machine. The following are exemplary schema 31 for mapping between the MATLAB® data types and the HDF5 data types.

Names

In the illustrative embodiment, the schema 31 maps MATLAB® names (names of variables, and fields of structs) to the identical HDF5 names because the set of legal HDF5 names is a superset of the set of legal MATLAB® names. The schema 31 can use HDF5 names that are not legal MATLAB® names for specialized data, without colliding with a MATLAB® variable.

Variables

The illustrative embodiment maps each saved MATLAB® variable to an immediate child group or dataset of the HDF5 root group in the hierarchy of the HDF5 file format. Each immediate child group of the HDF5 root group, where it has a name that is identical to a legal MATLAB® variable name, contains a saved MATLAB® variable.

MATLAB® Class

Every HDF5 dataset or group, which corresponds to a well-formed MATLAB® value, has an HDF5 attribute describing its MATLAB® class. In the illustrative embodiment, the attribute name is MATLAB_class, the datatype of the attribute is a fixed length string, the dataspace of the attribute is scalar, and the data is the MATLAB® class name. The MATLAB® class name may be one of the reserved names for built-in MATLAB® classes (e.g. double, float, char, etc.) or it may name a user-defined class. The term "well-formed MATLAB® value" is used to refer not only to the value of variables, but to any value available to the MATLAB® user, such as the contents of a cell of a cell array, or a field of a struct.

Global Attribute

The HDF5 dataset or group corresponding to a global MATLAB® variable is marked as global by the presence of an HDF5 attribute named MATLAB_global. The datatype and dataspace of the attribute are ignored. The illustrative embodiment uses a scalar dataspace of a single 1-byte integer, but this attribute may indicate that the variable is global by the presence of the attribute.

Dimensions and Storage Order

For non-empty MATLAB® values, the MATLAB® dimensions may correspond to the dataspace dimensions in reverse order. The storage order of the data from the MATLAB® variable in memory may correspond directly to the storage order of the data in the HDF5 file. MATLAB® uses FORTRAN-style indexing where the first index varies most rapidly. HDF5 uses C-style indexing where the last index varies most rapidly. In order to preserve the linear order of elements (most important for performance) the dimensions are reversed. For example, a MATLAB® array A(2,3) having the order of elements a(0,0), a(1,0), a(0,1), a(1,1), a(2,0) and a(2,1) is stored as an HDF array A(3,2) having the order of elements a(0,0), a(0,1), a(1,0), a(1,1), a(2,0) and a(2,1).

Endian-Agnostic

The endian-ness of data is a property of the HDF5 datatype associated with each dataset. When data elements are written in little or big-endian representation, either format may be chosen. The little or big-endian refer to which bytes are most significant in multi-byte data types and describe the order in which a sequence of bytes is stored in a computer memory. In a big-endian system, the most significant value in the sequence is stored at the lowest storage address (i.e., first). In a little-endian system, the least significant value in the sequence is stored first. The platforms of the MATLAB® environment 4 may write data in their native format, and convert, if necessary, on reading. Many computers, particularly IBM mainframes, use a big-endian architecture. Other computers, including PCs, use the little-endian system. The bit ordering within each byte can also be big- or little-endian, and some architectures actually use big-endian ordering for bits and little-endian ordering for bytes, or vice versa. The computing environment 4 may be adapted for the endian-ness of the platform on which the computing environment 4 is provided. The data in a MAT file has an endian-ness. The computing environment 4 allows a user not to care about the match or mismatch between the platform's endian-ness and the file data endian-ness. When storing data in the HDF5 datatype, the computing environment 4 may describe the endian-ness of the data in each dataset in the HDF5 file 8.

Datatype for Dimensions and Indices

MATLAB® indices and dimensions are written as unsigned 32, or a greater power of 2, bit integers. Analogous to endian-ness of data, the platforms of the computing environment 4 may write indices in their native length. At the time of reading the data, the platforms may check the datatype, and prepare for the possibility of overflow converting to their native datatype. Indices are explicitly written as data in the case of sparse matrices. Dimensions are explicitly written as data in the case of empty matrices and sparse matrices. The empty matrices and sparse matrices will be described below in more detail.

Full Doubles and Singles

Non-empty double and single-precision matrices are written as a dataset of IEEE standard floating point double and single data types in the HDF5 file.

Complex

If the MATLAB® double or single is complex, the HDF5 datatype will be a complex datatype with fields real and image. The types of both fields may be the corresponding (double or single) IEEE standard floating point number. By placing real and imaginary parts of a single element beside each other, this amounts to interlaced storage.

Integer Classes

MATLAB® integer classes are written as datasets of the corresponding HDF5 integer datatype.

Disambiguating Integer Storage

In cases where non-integer MATLAB® types are stored as integer HDF5 data types, an attribute named MATLAB_int_decode may be added to the dataset. In the illustrative embodiment, the dataspace is scalar. The datatype of the attribute is any integer suitable to represent the C enum:

typedef enum {NO_INT_HINT=0, LOGICAL_HINT, UTF16_HINT} integerDecodingHint;

The attribute may be optional if its value is NO_INT_HINT.

Logicals

MATLAB® logicals may be stored as a numeric array of UINT8s. Because this is ambiguous without additional information, the presence of the MATLAB_int_decode attribute, as described above, with value LOGICAL_HINT may be necessary. Without the MATLAB_int_decode attribute, this may be an UINT8 array.

Characters

MATLAB® chars may be stored as a numeric array of UINT16s, representing the MATLAB® native UTF-16 character encoding. Because this is ambiguous without additional information, the presence of the MATLAB_int_decode attribute, as described above, with value UTF16_HINT may be necessary. The characters may be stored in Unicode, without conversion to local code page. In the illustrative embodiment, HDF5 only provides an ASCII character datatype.

Sparse Array

Figure 4B:
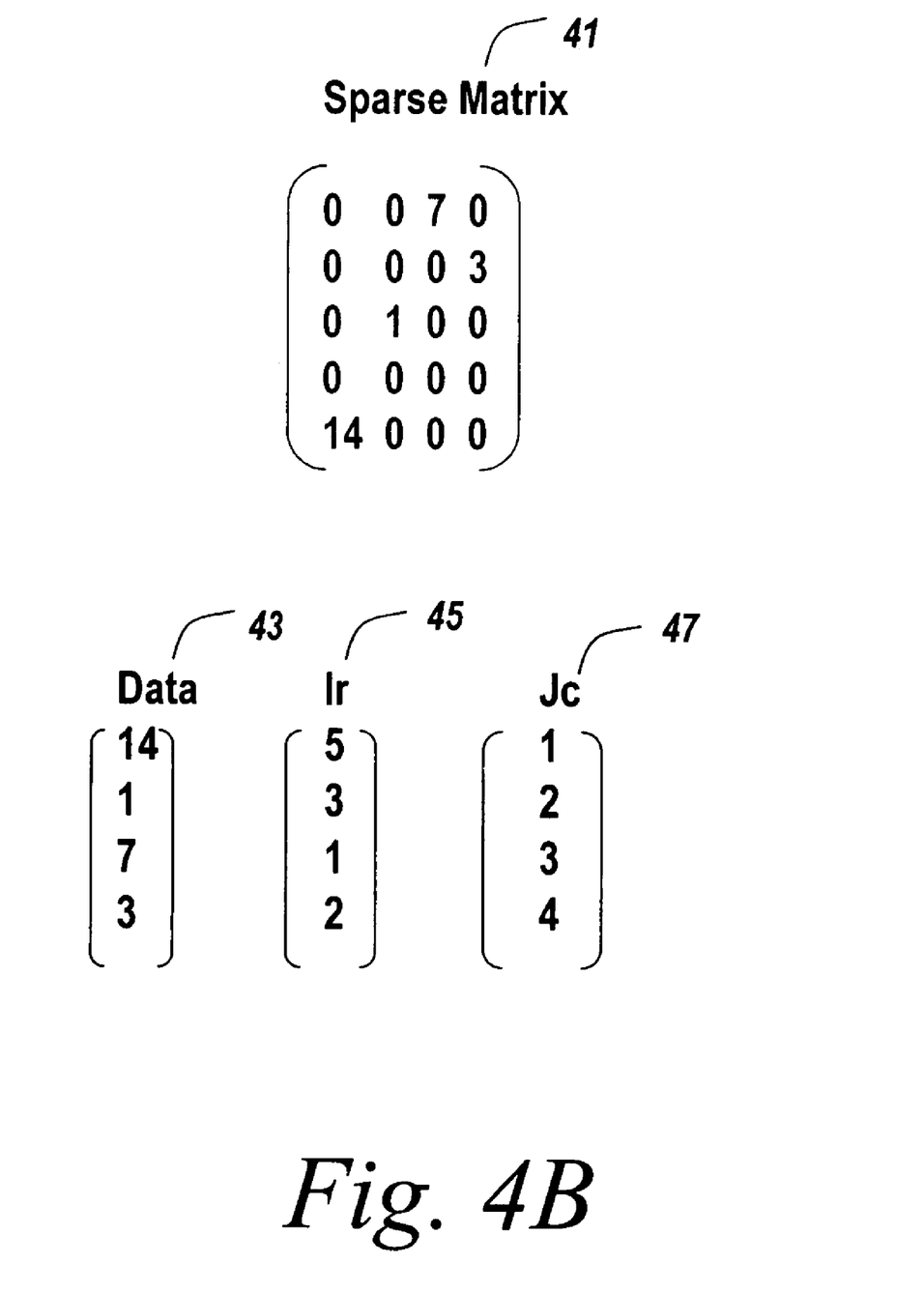
FIG. 4B shows an exemplary sparse array.

Sparse arrays (of all sparse types) are stored as a group containing (in the general case) three (3) datasets. The three datasets correspond to MATLAB®'s internal representation of a sparse array. Their names are data, ir and jc. All three datasets may have a one-dimensional dataspace. FIG. 4B shows an exemplary sparse matrix 41. The datatype of the data dataset 43 may be the same as the corresponding non-sparse representation. The ir data set 45 and the jc dataset 47 contain row and column indices, respectively. A sparse matrix with all zero elements may not have the data and jc groups, only the ir group. In order to disambiguate a sparse matrix from the (admittedly pathological) case of a scalar struct with three fields coincidentally named "data", "ir", and "jc", all groups representing sparse matrices may have an attribute named MATLAB_sparse. Because the number of rows of a sparse matrix is not represented in the data, ir, or jc components, it may be stored as the value of the MATLAB_sparse attribute. Because this is a dimension, its datatype is also that of a MATLAB® dimension.

In an embodiment, the sparse matrix may be represented in canonical form, such as controller canonical form and observer canonical form, to store its data in HDF5. Since the canonical form diagonalizes the sparse matrix by a similarity transformation, the sparse matrix can be stored in HDF5 using a single dataset.

Empties

Because HDF5 data spaces must have positive dimensions, but MATLAB® allows matrices with any number of zero dimensions, the representation of MATLAB® empty matrices may be different from that of non-empty matrices. All empties may be represented as a dataset with attribute MATLAB_empty. The dataset may have a one-dimensional dataspace, and the data may contain the dimensions of the matrix, in MATLAB® order.

Cell Arrays

In the illustrative embodiment, a cell array is used to refer to an array whose elements can hold any arbitrary data type, including structs or other cell arrays. A user can store arrays of different types and/or sizes within the cells of a cell array. For example, a user can store a 1-by-50 char array, a 7-by-13 double array, and a 1-by-1 unit 32 in cells of the same cell array. A cell array is stored as a dataset of HDF5 references. The references may point to child nodes of the top level group named #refs#. Each element of the cell array is stored in one of those child nodes of #refs#. This permits, though does not require, sharing of data by having multiple references point at the same place. #refs# does not correspond to any named MATLAB® variable, nor do its child nodes. The child nodes do correspond to values, typically elements of a cell array or struct, but their HDF5 names are for reference within the file.

Structs

A struct is an array whose elements are indexed by names (called "fields"), as well as by numerical indices. Like cell arrays, the elements of a struct can be any data type, including other structs. For example, one field may contain a text string representing a name, another may contain a scalar representing a billing amount, a third may hold a matrix of medical test results, and so on. A struct is stored as a group. Each field of the struct corresponds to, and has the same name as, a child of the group. In the case of non-scalar structs, each child of the group may be a dataset of references, in the same manner as the cell array described above. In order to preserve order of fields, when there is more than one field, the set of field names is stored, in order, as an attribute named MATLAB_fields. The MATLAB_fields attribute is optional in the case of a single field. In the case of an empty struct, the rule for empties may take precedence, in determining storage as a dataset, but the field names attribute will still be present.

Scalar Structs

If the struct is scalar, the HDF5 representation may be optimized by skipping the dataset of references. In this case, the contents of each child of the group correspond directly to the corresponding field values.

Storage of Objects Requiring Serialization or Marshaling

In cases where MATLAB® object types are stored by converting them to non-object types, an attribute named MATLAB_object_decode may be added to the group or dataset. In the illustrative embodiment, the dataspace is scalar. The datatype of the attribute may be any integer suitable to represent the C enum:

typedef enum {NO_OBJ_HINT=0, FUNCTION_HINT, OBJECT_HINT, OPAQUE_HINT} objectDecodingHint;

MATLAB® Object Oriented Programming System (OOPS) objects

MATLAB® OOPS objects are stored as structs. Because this is ambiguous without additional information, the presence of the MATLAB_object_decode attribute, as described above, with value OBJECT_HINT may be necessary.

Opaque Classes

MATLAB® opaque classes are stored by first converting them to a non-opaque type, plus additional information to be stored in the subsystem data, then secondly storing the non-opaque data as described above. The first stage, conversion to a non-opaque type, takes place as a MATLAB-to-MATLAB transformation. The first stage is therefore independent of the choice of file format, and could be applied to any marshalling or serialization method. Because the non-opaque result of the first stage is ambiguous without additional information, the presence of the MATLAB_object_decode attribute, as described above, with value OPAQUE_HINT may be necessary in the second stage to indicate that the conversion should be reversed at read time. The reconstruction of an opaque type requires additional information at read time. This additional information, called the subsystem data, may be stored under a top level group named #subsystem#.

Function Handles

A function handle refers to a value and data type that provides a means of calling a function indirectly. A user can pass function handles in calls to other functions (often called function functions). A user can also store function handles in data structures for later use (for example, as Handle Graphics® callbacks). MATLAB® function handles are stored by converting them to a non-opaque type, plus additional information to be stored in the subsystem data. Because the non-opaque result is ambiguous without additional information, the presence of the MATLAB_object_decode attribute, as described above, with value FUNCTION_HINT may be necessary to indicate that the conversion should be reversed at read time.

Referring back to FIG. 4, the computing environment 4 may provide an application program interface (API) 33 for creating, opening, and closing HDF5 file 8. The API 33 may also enable a user to create and write groups, datasets, and their attributes to the HDF5 file 8. With the API 33, a user may remove the datatype, dataspace and dataset objects separately from the HDF5 file 8. Using the API 33, a user can read groups, datasets and their attributes from HDF5 files. By reading data from the HDF5 files, a user may obtain information about a dataset, such as the datatype associated with a dataset, and dataspace information. The API 33 may enable a user to access portions (or selections) of a dataset.

The computing environment 4 may also provide a user interface 35 that enables a user to store data from the MATLAB® workspace 6 into the HDF5 file 8 and to load data from the HDF5 file 8 into the MATLAB® workspace 6. For example, the user may enter the following command to save and load data (steps 51 and 61 in FIGS. 5 and 6).

>>save-v.(version number)

>>load-v.(version number)

Figure 5:
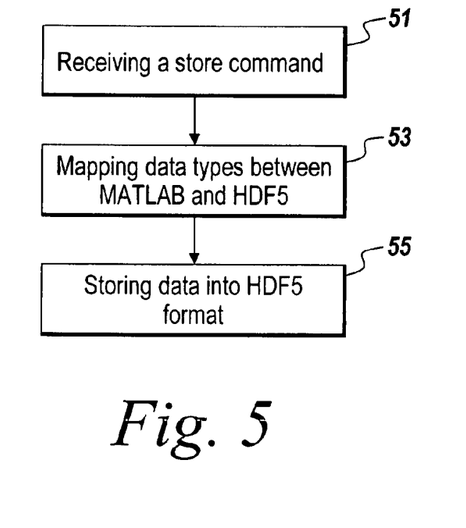
FIG. 5 is a flow chart showing an exemplary operation for storing data in a HDF5 file format.
Figure 6:
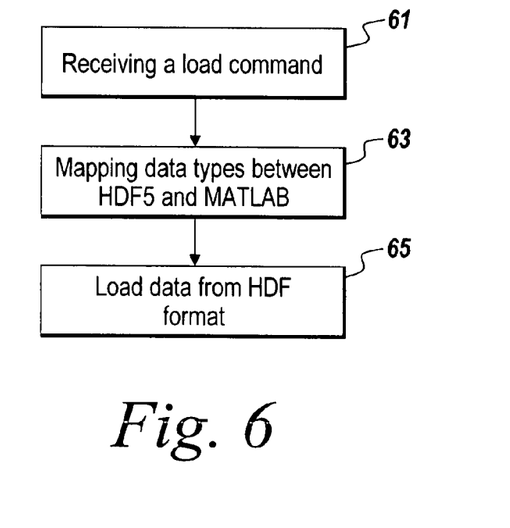
FIG. 6 is a flow chart showing an exemplary operation for loading data from the HDF5 file format into the computing environment.

In response to the input from the user, the computing environment 4 may map between the data types of the computing environment and the data types of the HDF5 based on the schema 31 described above 8 when its product version (version number) supports HDF5 file format (steps 53 and 63 in FIGS. 5 and 6). The computing environment then stores data in the HDF5 file 8 and load data from the HDF5 file (steps 55 and 65 in FIGS. 5 and 6). When the data is stored in the HDF5 file 8, the data may be encrypted. When the product version (version number) does not support HDF5 file format, the computing environment 4 may store data from the workspace 6 into other data file formats, such as a legacy MAT file format, that the product version supports.

In the illustrative embodiment, the computing environment 4 may provide a user interface 35 that enables a user to define or modify the mapping between the data types of the computing environment 4 and the data types of the HDF5. The illustrative embodiment may provide multiple schemas 31 that can map between the data types of the computing environment to the data types of different scientific data formats, such as CDF (Common Data Format), FITS (Flexible Image Transport System), GRIB (GRid In Binary), NetCDF (Network Common Data Form), etc. The computing environment 4 may provide a user interface 35 that enables a user to select one or more of the multiple schemas 31.

Those of skill in the art will appreciate that a spreadsheet can be treated as an array and the illustrative embodiment of the present invention may be practiced with spreadsheets.

Certain embodiments of the present invention are described above. It is, however, expressly noted that the present invention is not limited to these embodiments, but rather the intention is that additions and modifications to what is expressly described herein also are included within the scope of the invention. Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. A computer-implemented method for storing data from an array-based computing language in a determined scientific data format enabling data sharing, the method comprising:
    providing an array-based computing language data object having a plurality of elements, wherein at least one element, in the plurality of elements, is of a user-defined type, and wherein a first element, in the plurality of elements, is of a first type and a second element, in the plurality of elements, is of a second type, the first type being different than the second type;
    associating the array-based computing language data object with a particular top level group in the determined scientific data format, wherein the particular top level group includes one or more child nodes;
    storing a specific element of the array-based computing language data object in a specific child node of the particular top level group, wherein the specific element is associated with a reference that is used to reference the specific child node; and
    storing description information associated with the array-based computing language data object, wherein the stored description information enables loading of data stored in the determined scientific data format as an array-based computing language object.

2. The computer implemented method of claim 1, further comprising referencing the specific child node of the particular top level group with a plurality of elements of one or more array-based computing language data objects, the referencing resulting in data sharing among the plurality of elements.

3. The computer implemented method of claim 1, wherein the array-based computing language data object comprises an array having numeric indices, name indices or both.

4. The computer implemented method of claim 1, wherein a name index of the specific element of the array-based computing language data object is assigned as a name of the specific child node referenced by the specific element.

5. The computer implemented method of claim 1, further comprising:
    receiving an input; and
    determining the scientific data format based on the received input.

6. The method of claim 1, wherein the reference is a pointer.

7. The method of claim 1, wherein the reference is a name associated with the specific child node.

8. A computer-readable storage medium holding computer-executable instructions for storing data from an array-based computing language in a determined scientific data format enabling data sharing, the medium comprising one or more instructions for:
    providing an array-based computing language data object having a plurality of elements, wherein at least one element, in the plurality of elements, is of a user-defined type, and wherein a first element, in the plurality of elements, is of a first type and a second element, in the plurality of elements, is of a second type, the first type being different than the second type;
    associating the array-based computing language data object with a particular top level group in the determined scientific data format, wherein the particular top level group includes one or more child nodes; and
    storing a specific element of the array-based computing language data object in a specific child node of the particular top level group, wherein the specific element is associated with a reference that is used to reference the specific child node.

9. The computer-readable storage medium of claim 8, wherein the specific child node of the particular top level group is referenced by a plurality of elements of one or more array-based computing language data objects, the referencing resulting in data sharing among the plurality of elements of the one or more array-based computing language data objects.

10. The computer-readable storage medium of claim 8, wherein the array-based computing language data object comprises an array having numeric indices, name indices, or both.

11. The computer-readable storage medium of claim 8, wherein a name index of the specific element of the array-based computing language data object is assigned as a name of the specific child node referenced by the specific element.

12. The computer-readable storage medium of claim 8, further comprising one or more instructions for:
    receiving an input; and
    determining the scientific data format based on the input.

13. The medium of claim 8, wherein the reference is a pointer.

14. The medium of claim 8, wherein the reference is a name associated with the specific child node.

15. A computing device for storing data from an array-based computing environment in a determined scientific data format enabling data sharing, the computing device comprising:
    an array-based computing environment having a workspace for holding array-based computing language data objects used in the array-based computing environment;
    storage for storing data in at least one determined scientific data format;
    a schema for:
        storing an array-based computing language data object having a plurality of elements in a determined scientific data format in storage, wherein at least one element, in the plurality of elements, is of a user-defined type, and wherein a first element, in the plurality of elements, is of a first type and a second element, in the plurality of elements, is of a second type, the first type being different than the second type, the storing comprising:
            associating the array-based computing language data object in the workspace with a particular top level group having at least one child node in the determined scientific data format, and directing the computing device to store at least one specific element of the array-based computing language data object in a specific child node of the particular top level group, wherein the specific element is associated with a reference that is used to reference the specific child node; and loading data in the determined scientific data format from the storage into the array-based computing environment into the workspace as an array-based computing language data object.

16. The computing device of claim 15, wherein the specific child node of the particular top level group is referenced by a plurality of elements of one or more array-based computing language data objects, the referencing resulting in data sharing among the plurality of elements of the one or more array-based computing language data objects.

17. The computing device of claim 15, further comprising a second schema for:

storing an array-based computing language data object from the workspace in a second determined scientific data format in storage; and loading data in the second determined scientific data format from the storage into the array-based computing environment into the workspace as an array-based computing language data object.

18. The computing device of claim 15, further comprising a user interface for receiving an input, wherein the scientific data format is determined based on the received input.

19. The computing device of claim 15, wherein the array-based computing environment comprises the schema.

20. A computing device for storing data from an array-based computing environment in a determined scientific data format enabling data sharing, the computing device comprising:

means for providing an array-based computing language data object having a plurality of elements, wherein at least one element, in the plurality of elements, is of a user-defined type, and wherein a first element, in the plurality of elements, is of a first type and a second element, in the plurality of elements, is of a second type, the first type being different than the second type;

means for associating the array-based computing language data object with a particular top level group in the determined scientific data format, wherein the particular top level group includes one or more child nodes; and means for storing a specific element of the array-based computing language data object in a specific child node of the particular top level group, wherein the specific element is associated with a reference that is used to reference the specific child node.

21. The computing device of claim 20, wherein the specific child node of the particular top level group is referenced by a plurality of elements of one or more array-based computing language data objects, the referencing resulting in data sharing among the plurality of elements.

* * * * *